(12) United States Patent
Mahfouz et al.

(10) Patent No.: US 10,275,845 B2
(45) Date of Patent: Apr. 30, 2019

(54) LUGGAGE RETRIEVAL AND DISTRIBUTION

(71) Applicant: INTERNATIONAL BUSINESS MACHINES CORPORATION, Armonk, NY (US)

(72) Inventors: Tamer A. Mahfouz, Cairo (EG); Nader M. Nassar, Yorktown Heights, NY (US); Tamer M. Nassar, Brookfield, CT (US); Hesham E. M. Soultan, Cairo (EG); Alaa S. Youssef, Valhalla, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/183,909

(22) Filed: Jun. 16, 2016

(65) Prior Publication Data

US 2017/0362033 A1 Dec. 21, 2017

(51) Int. Cl.
*B65G 1/137* (2006.01)
*G06K 7/14* (2006.01)
*G06K 7/10* (2006.01)
*G06Q 50/30* (2012.01)
*B64F 1/36* (2017.01)

(52) U.S. Cl.
CPC .......... *G06Q 50/30* (2013.01); *B64F 1/368* (2013.01); *B65G 1/137* (2013.01); *G06K 7/1417* (2013.01); *G06K 7/10366* (2013.01)

(58) Field of Classification Search
CPC .... G06Q 50/30; B65G 1/137; G06K 7/10366; G06K 7/1417

USPC ........................................................ 700/215
See application file for complete search history.

(56) References Cited

U.S. PATENT DOCUMENTS

| 4,416,435 A | 11/1983 | Szendrodi et al. | |
|---|---|---|---|
| 6,323,782 B1 * | 11/2001 | Stephens | G07C 9/00103 340/10.31 |
| 6,459,954 B1 * | 10/2002 | Kratzenberg | G07F 7/04 340/935 |

(Continued)

FOREIGN PATENT DOCUMENTS

| CN | 1460233 A | 12/2003 |
|---|---|---|
| CN | 1836797 A | 9/2006 |

*Primary Examiner* — Michael Collins
(74) *Attorney, Agent, or Firm* — Cantor Colburn LLP; Kurt Goudy

(57) ABSTRACT

A computer-implemented method, system, and computer program product for distributing luggage among a plurality of outlet ports of a luggage distribution unit is provided. The method includes associating, using a processor system, a passenger key and a luggage identification (ID) device of a luggage unit, and assigning, using the processor system, the luggage ID device to a dispensing unit based at least in part on a determination of a desired distribution of luggage units among the plurality of outlet ports. The method also includes detecting a location of the passenger key, providing a status of the luggage ID device of the luggage unit, and signaling the presence of the luggage ID device and the luggage unit at the dispensing unit. The method includes receiving the association to access the at least one luggage unit, and releasing the luggage unit responsive to receiving the association.

19 Claims, 5 Drawing Sheets

(56) References Cited

U.S. PATENT DOCUMENTS

| | | | |
|---|---|---|---|
| 6,698,577 B1* | 3/2004 | Conklin, Jr. | G09F 19/22 198/502.1 |
| 6,974,928 B2* | 12/2005 | Bloom | B07C 3/00 209/583 |
| 7,802,724 B1 | 9/2010 | Nohr | |
| 7,866,554 B2 | 1/2011 | Cash et al. | |
| 8,742,922 B2 | 6/2014 | Ferrari | |
| 9,811,784 B2* | 11/2017 | Wan | G06Q 10/00 |
| 9,830,572 B2* | 11/2017 | Wan | G06Q 10/0836 |
| 9,898,711 B2* | 2/2018 | Neal | G06Q 10/0836 |
| 2006/0020489 A1 | 1/2006 | Rivalto | |
| 2007/0299701 A1* | 12/2007 | Boyer | G06Q 10/02 705/5 |
| 2009/0015398 A1 | 1/2009 | Bhogal et al. | |
| 2010/0069047 A1 | 3/2010 | Mehmet | |
| 2010/0207780 A1 | 8/2010 | Newton | |
| 2011/0267192 A1 | 11/2011 | Goldman et al. | |
| 2013/0261792 A1 | 10/2013 | Gupta et al. | |
| 2015/0029001 A1 | 1/2015 | Pleshek et al. | |

\* cited by examiner

LUGGAGE RETRIEVAL AND DISTRIBUTION

BACKGROUND

The present invention relates to airport luggage distribution and management, and more specifically, to methods, systems and computer program products for efficient and flexible luggage retrieval in a luggage retrieval system.

As airplane capacity increases for both passenger seating and storage space, the baggage claim areas of airports are becoming increasingly crowded. Accordingly, there is a greater need for effective crowd management in baggage claim areas. Crowding in baggage claim areas can take a variety of forms, including, for example, the clustering of passengers near the single egress points of the baggage claim carousels, as well as the need for passengers who have retrieved their luggage to work their way through the densely packed crowds with their bulky luggage in tow. Security is an even greater concern in crowded baggage claim areas because, as the number of passengers and luggage increases, the probability of a passenger collecting the wrong luggage also increases.

SUMMARY

According to one or more embodiments of the present invention, a computer-implemented method for distributing luggage among a plurality of outlet ports of a luggage distribution unit is provided. The method includes associating, using a processor system, a passenger key and a luggage identification (ID) device of a luggage unit, and assigning, using the processor system, the luggage ID device to a dispensing unit based at least in part on a determination of a desired distribution of luggage units among the plurality of outlet ports. The method also includes detecting a location of the passenger key, providing a status of the luggage ID device of the luggage unit, and signaling the presence of the luggage ID device and the luggage unit at the dispensing unit. The method includes receiving the association to access the luggage unit, and releasing the luggage unit responsive to receiving the association.

According to one or more embodiments, a system for distributing luggage among a plurality of outlet ports of a luggage distribution unit is provided. The system includes a dispensing unit, a plurality of sensors, a display unit, and a processor. The processor of the system is configured to associate, using a processor system, a passenger key and a luggage identification (ID) device of a luggage unit, and assign, using the processor system, the luggage ID device to a dispensing unit based at least in part on a determination of a desired distribution of luggage units among the plurality of outlet ports. The system is further configured to detect a location of the passenger key, provide a status of the luggage ID device of the luggage unit, and signal the presence of the luggage ID device and the luggage unit at the dispensing unit. The system is configured to receive the association to access the luggage unit, and release the luggage unit responsive to receiving the association.

According to yet one or more embodiments, a computer program product for distributing luggage among a plurality of outlet ports of a luggage distribution unit, the computer program product including a computer readable storage medium having program instruction embodied therewith, wherein the computer readable storage medium is not a transitory signal per se, the program instructions executable by a system to cause the system to perform a method is provided. The method includes associating, using a processor system, a passenger key and a luggage identification (ID) device of a luggage unit, and assigning, using the processor system, the luggage ID device to a dispensing unit based at least in part on a determination of a desired distribution of luggage units among the plurality of outlet ports. The method also includes detecting a location of the passenger key, providing a status of the luggage ID device of the luggage unit, and signaling the presence of the luggage ID device and the luggage unit at the dispensing unit. The method includes receiving the association to access the luggage unit, and releasing the luggage unit responsive to receiving the association.

DETAILED DESCRIPTION

In one or more embodiments, a baggage claim carousel and a target outlet port can be assigned to a passenger by an origin airport. In one or more embodiments, the baggage claim carousel and target outlet port can be assigned by the destination airport, as the origin airport may not have knowledge of the destination airport's availability and baggage load. Additionally, a preferred baggage claim carousel and target outlet port can be requested by a passenger and confirmed during the flight by the destination airport. In one or more embodiments, a passenger can request a particular type of dispensing unit and/or outlet port during check-in or during the booking process. In one or more embodiments, airlines are able to pair luggage with a boarding ticket or a smart device of a passenger where the pairing can be based on the number of passengers checked-in for a particular flight or the number of passengers expected to be in the neighboring baggage claim area, type of luggage, or the like. In one or more embodiments, the luggage distribution system performs load balancing of luggage for a single dispensing unit and can further perform load balancing of luggage across a plurality of dispensing units.

One or more embodiments include a technique for secure luggage retrieval where the luggage will not be released from an assigned outlet port until the passenger notifies the system that they are in a location near the assigned outlet port to collect their luggage. In one or more embodiments, a passenger who has been assigned an outlet port at check-in time can select a different outlet port by scanning their key at a key reader of an outlet port of a dispensing unit. A successful assignment will be signaled to the passenger if capacity is available, otherwise an indication of rejection will be signaled to the passenger.

In one or more embodiments, the carousel is able to track luggage by using sensors, readers and/or cameras that detect the luggage at the belt entry and at the location of each outlet port. In one or more embodiments, once a specific piece of luggage is detected and the tracking process has started, an output screen can display the estimated time for releasing the luggage for a specific passenger. The time information is continuously updated as the luggage moves through the carousel. Once the luggage passes the sensor located before the target outlet, the display will indicate the luggage presence at the outlet port. After the passenger has retrieved their luggage from the outlet port, the availability for the outlet port can be returned to the luggage distribution system for reassignment.

Figure 1:
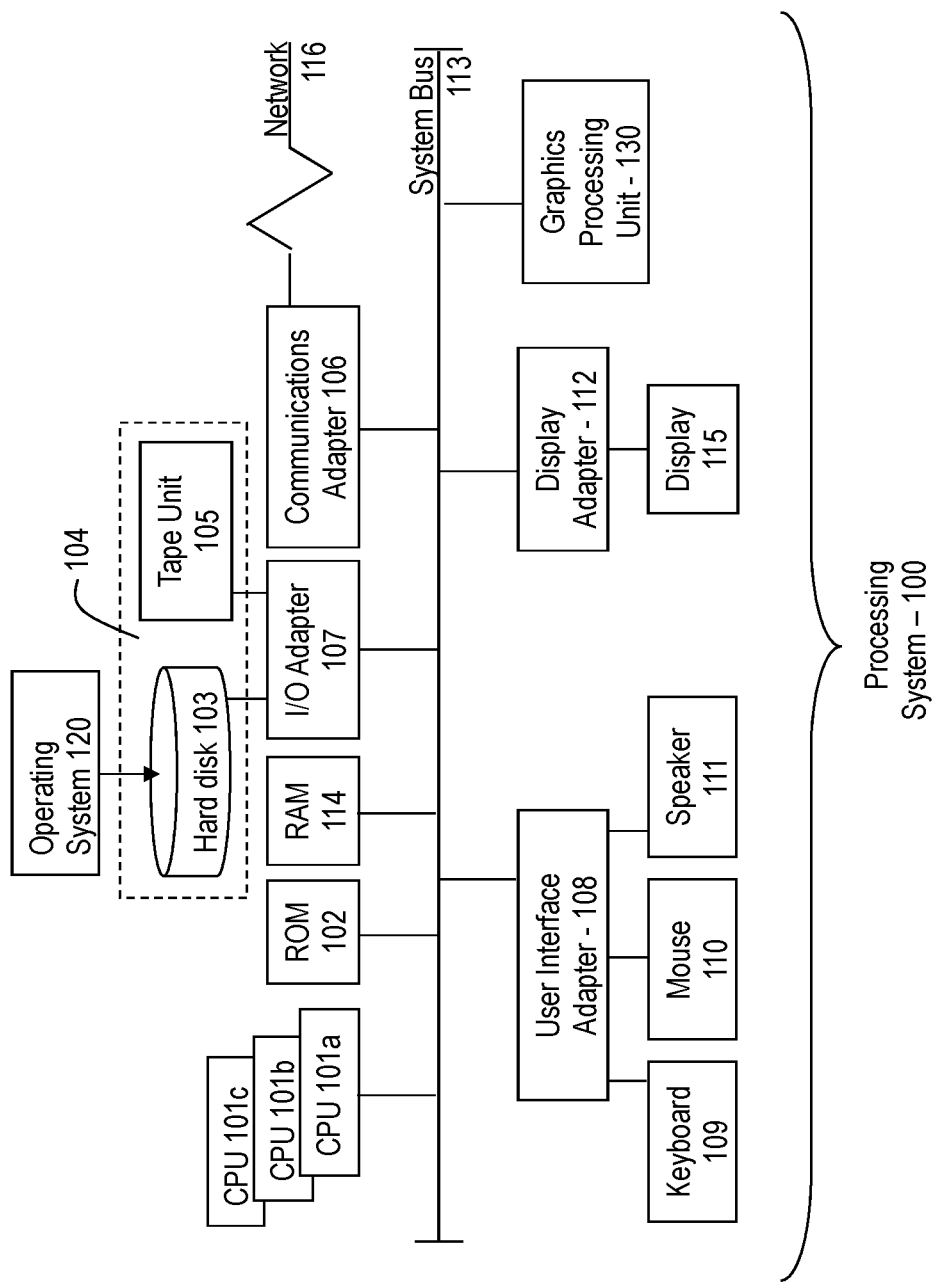
FIG. 1 is a block diagram illustrating one example of a processing system for practice of the teaching herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components shown in FIG. 1.

Figure 2:
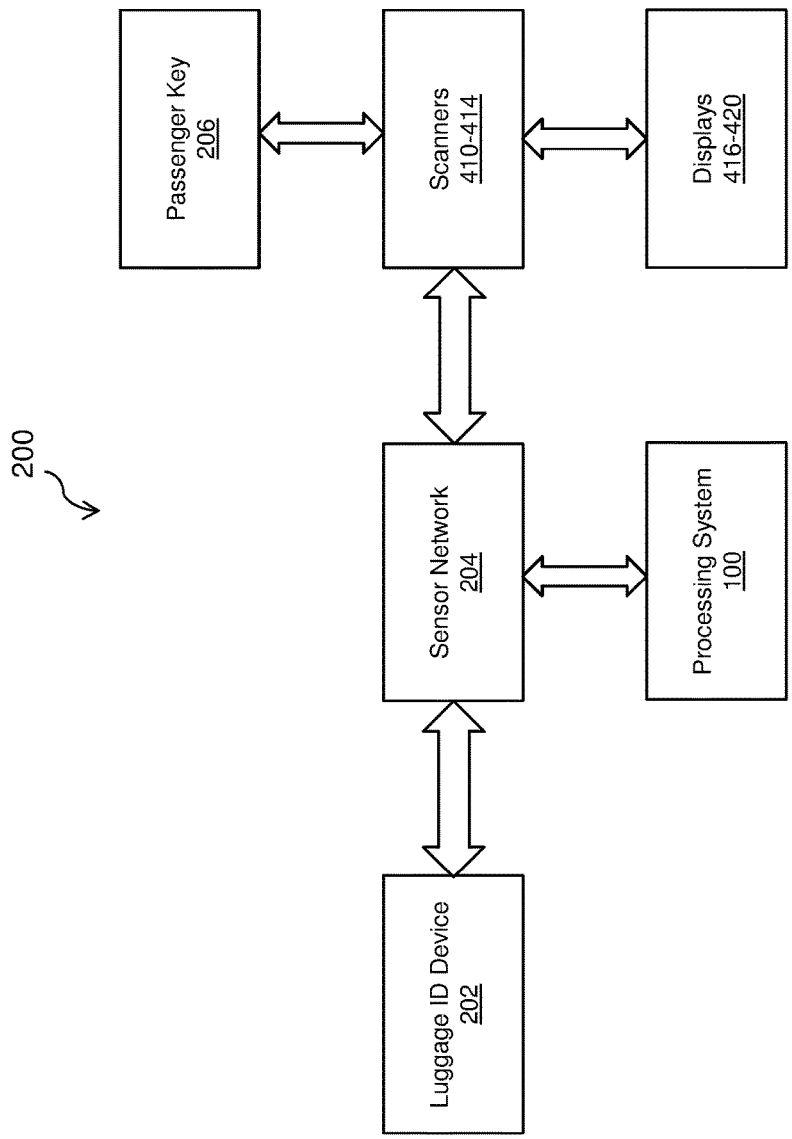
FIG. 2 is a block diagram for distributing luggage among a plurality of outlet ports of a luggage distribution unit in accordance with one or more embodiments.

Now referring to FIG. 2, a block diagram of a system 200 for performing luggage retrieval using the disclosed luggage distribution system is provided. System 200 depicts a sensor network 204 including a plurality of sensors, scanners, or detectors, communicatively coupled to a processing system 100 as shown in FIG. 1. Sensor network 204 is also configured to detect a luggage ID device 202 that is attached to a luggage unit to track the luggage unit through a luggage distribution system. The system 200 also includes a plurality of scanners 410-414 (scanners 410-414 also shown in FIG. 4) that are capable of receiving a passenger key 206 and is also capable of communicating with the plurality of displays 416-420 (displays 416-420 also shown in FIG. 4). In one or more embodiments, the scanners 410-414 can be configured as the key readers. In one or more embodiments, the system 200 is configured to perform the disclosed method.

Figure 3:
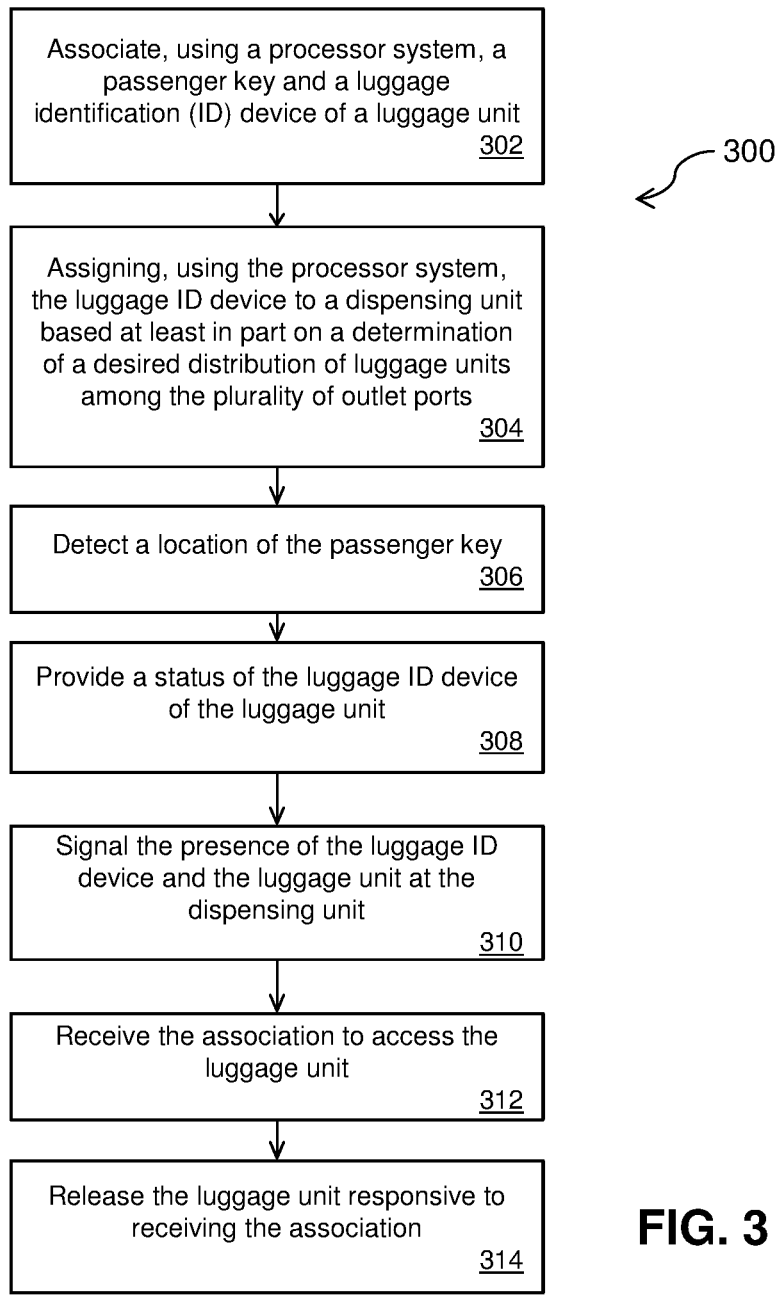
FIG. 3 is flow diagram for distributing luggage among a plurality of outlet ports of a luggage distribution unit in accordance with one or more embodiments.

Now referring to FIG. 3, a method 300 for performing luggage retrieval using the disclosed luggage distribution system is provided. Block 302 includes associating, using a processor system, a passenger key and a luggage identification (ID) device of a luggage unit. In one or more embodiments, the association includes identification information of a passenger and identification information of the luggage. The association can be stored in a device, such as a database or server, to manage the passenger and flight information. The association can include data about the passenger including their name, flight number, seat number, or any other type of information that can be used to associate the passenger with their luggage. The luggage can be identified by a tag, index, or other identifier used for tracking the luggage. The association is provided to the passenger in the form of a key which can be used for luggage retrieval. The key can be linked to a passenger's ticket, QR codes, data matrices, RFIDs, etc. A digital key can be provided to the passenger through a mobile application of a mobile device.

Block 304 includes assigning, using the processor system, the luggage ID device to a dispensing unit based at least in part on a determination of a desired distribution of luggage units among the plurality of outlet ports. In one or more embodiments, the assignment can be based on a particular preference or need of the passenger. In one or more embodiments, the system can include a plurality of dispensing units and the assignment of the dispensing unit can be based on the projected load for the plurality of dispensing units. Data entered at the time of check-in or booking regarding checked baggage can be used to distribute the load at a destination airport. The projection can further include information about the arrival time of passengers and their luggage. Also information regarding delayed flights and currently used baggage claim carousels can be used to distribute the load among the plurality of dispensing units. In one or more embodiments, the dispensing unit is a baggage claim carousel and each dispensing unit can include a plurality of outlet ports to provide multiple access points for passengers to retrieve their luggage. The plurality of outlet ports can alleviate the crowding of passengers at a single access point for collecting luggage of a baggage claim carousel.

Block 306 includes detecting a location of the passenger. In one or more embodiments, the location of a passenger is signaled to the dispensing unit using a passenger key so the luggage will be retrieved by the system. For example, a passenger can scan their ticket, which is the key related the pairing of the passenger and their luggage, that was provided at check-in or at the time of booking at a key reader located at the dispensing unit. By scanning the key at the key reader, the system will know that the passenger is located at the proper dispensing unit and is ready to receive their luggage. If a passenger goes to the wrong dispensing unit and scans their key at the associated key reader, the system will indicate to the passenger that they are in the wrong location. The clustering of passengers can be managed by steering the passengers to the assigned dispensing unit. In one or more embodiments, each dispensing unit having a plurality of outlet ports have their own associated key readers or scanners. A passenger can be assigned a particular outlet port that is physically spaced out among the dispensing unit. The system can further ascertain which outlet port the passenger is located at based on which key reader is scanned.

In one or more embodiments, a passenger using a mobile device is able to communicate with the system through a mobile application of a mobile device. The baggage retrieval system is capable of detecting the location of a passenger based on geo-location information, status information communicated through an application, or the passenger accessing the airport Wi-Fi system upon entering the terminal. A passenger can send an indication to the system that they have arrived at the destination airport. The dispensing unit may be equipped to determine whether a passenger is within proximity of the assigned dispensing unit and/or outlet port and responsive to the determination, the system can prompt the user to confirm they are in correct location.

At block 308, the method 300 includes providing a status of the luggage ID device of the luggage unit. In one or more embodiments, the dispensing unit is equipped with a display to present passengers with the approximate arrival time of their luggage. In addition the display can present an order in which the luggage will be delivered based upon the sequence in which the passengers scanned or confirmed their assigned keys. In one or more embodiments, passengers using a mobile device to communicate with the system are able to confirm their presence through the mobile application and will be able to have their luggage information added to the display. In one or more embodiments, each of the plurality of outlet ports are equipped with their own displays and the information for each passenger assigned to an outlet port associated can be displayed on their respective displays. After the passenger has been detected at the appropriate outlet port, the system can retrieve their luggage based on a key scan, mobile confirmation, or detection of the passenger being within proximity of the assigned dispensing unit and/or outlet port.

Block 310 provides signaling the presence of the luggage ID device and the luggage unit at the dispensing unit. In an exemplary embodiment, passengers will be notified of the availability of their luggage for collection as it is placed on the dispensing unit. In one or more embodiments, the passenger can be notified by the display associated with the assigned dispensing unit and/or outlet port. In one or more embodiments, the passenger can be notified through a mobile application of a device by receiving a signal indicating the availability of their luggage at the dispensing unit.

The method 300 further provides at block 312, receiving the association to access the at least one luggage unit. In one or more embodiments, the passenger can re-scan their key at the key reader to provide the association to the system. In one or more embodiments, a passenger using a mobile device can transmit their association having their key to the system. An added level of security is provided by having the passenger submit their key prior to retrieving their luggage. Block 314, in response to receiving the association, releases the at least one luggage unit from the assigned dispensing unit and/or outlet port. After the passenger retrieves their luggage, the dispensing unit and/or outlet port can be reassigned to balance the remaining load of luggage.

In one or more embodiments, a passenger can further request a specific dispensing unit and/or outlet port while in the baggage claim area. A passenger can submit a request for a dispensing unit and/or outlet port after entering the baggage claim area and assessing the crowds around the different dispensing units (carousels). The passenger can request to have the luggage delivered to a less crowded or free dispensing unit, which helps alleviate the cluster at the crowded dispensing unit. In one or more embodiments, the passenger scans their key at an outlet port to indicate their presence and submit a request.

Figure 4:
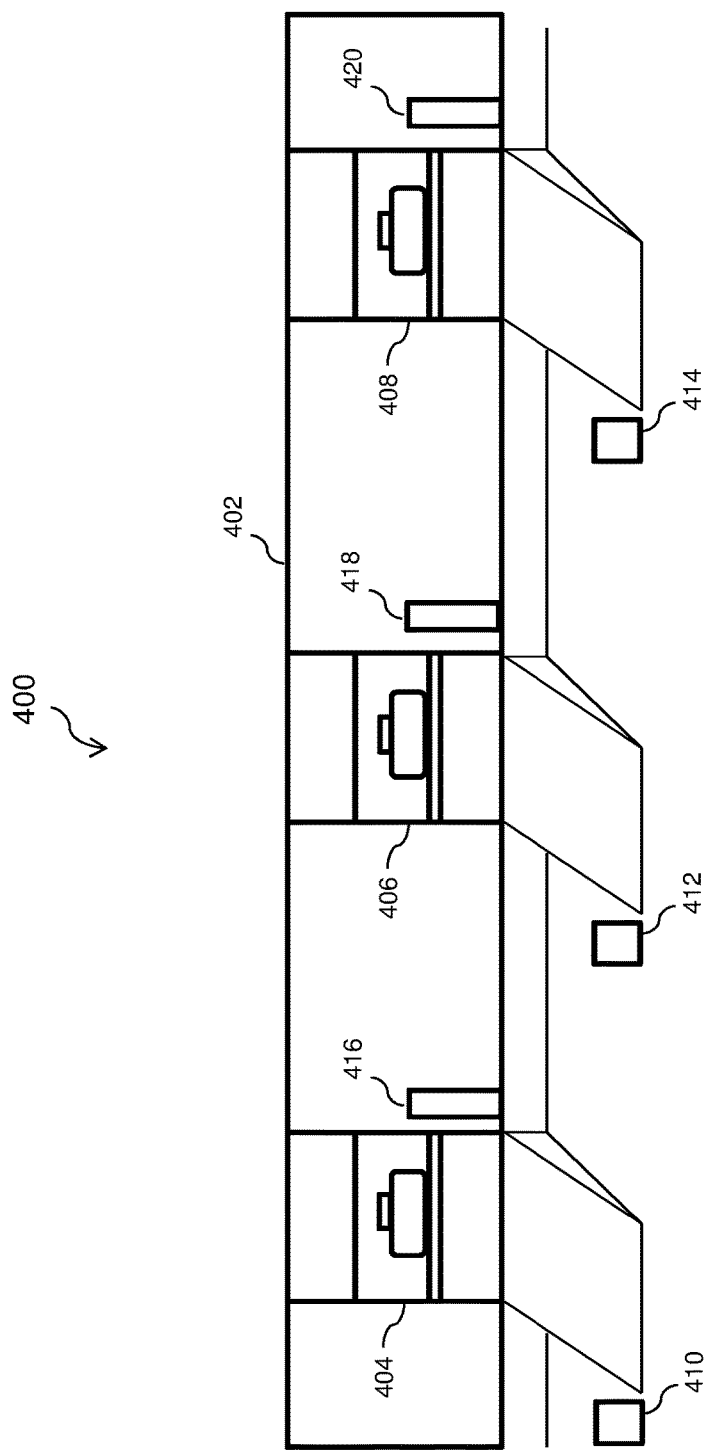
FIG. 4 is a block diagram for distributing luggage among a plurality of outlet ports of a luggage distribution unit in accordance with one or more embodiments.

Referring now to FIG. 4, a block diagram of a side view of a luggage distribution system 400 according to one or more embodiments is shown. The basic schematic of a dispensing unit 402 of the luggage distribution system 400 is illustrated having three outlet ports 404-408. FIG. 4 also illustrates the basic flow of the luggage on the dispensing unit. Although three outlet ports are shown, any number of outlet ports may be selected for the configuration to manage the distribution of luggage and to manage the crowding of passengers around the luggage carousel. Provided at each outlet port 404-408 is a scanner type device 410-414 which are configured to read a key from a passenger. It is known to one of ordinary skill in the art the scanner type device can be any type of device including other scanners, readers, and detectors. Upon scanning the key, displays 416-420 will be updated to notify the passenger of their position in the queue of a plurality of passengers and the estimated time for the luggage to arrival. The internal network of sensors tracking the location of the luggage that has been added to the dispensing unit is not shown in FIG. 4. The network of sensors communicate with the system for load balancing the luggage and also communicates with the display units 416-420. In one or more embodiments, the network of sensors are also able to communicate with a smart device of a passenger provide an update on the status of their luggage. In one or more embodiments, if a pre-defined percentage of the total luggage count is released, and the remaining luggage has crossed the carousel a pre-defined number of turns without the registration of their owners, the unclaimed luggage will be transferred to a specific store and the carousel will stop.

Figure 5:
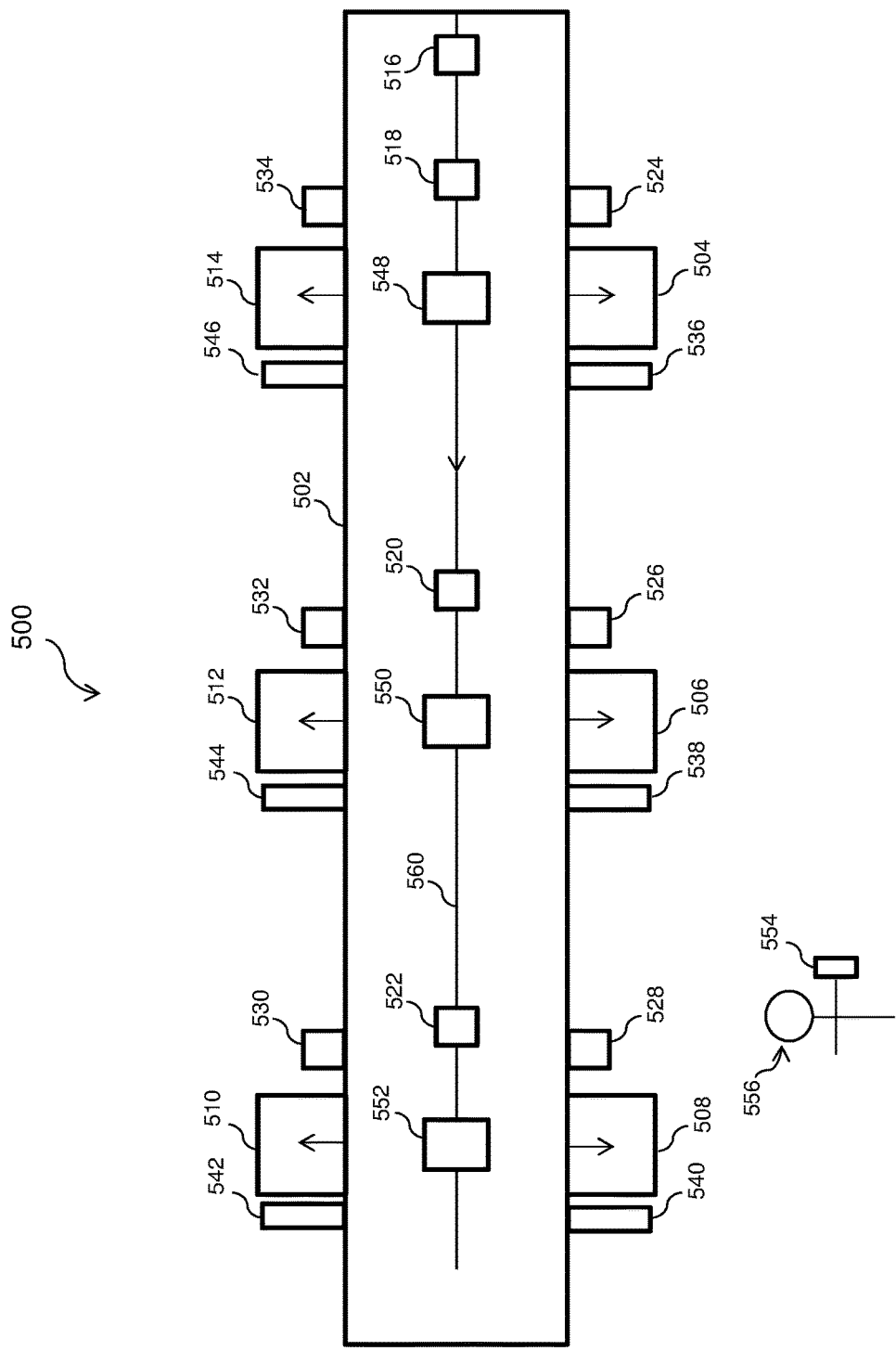
FIG. 5 is a block diagram for distributing luggage among a plurality of outlet ports of a luggage distribution unit in accordance with one or more embodiments.

Referring now to FIG. 5, a distribution system 500 is shown. Dispensing unit 502 is illustrated including a conveyor 560 and a plurality of outlet ports 504-514 for luggage retrieval. In this illustration six outlet ports 504-514 are shown, however any number of outlet ports can be utilized to manage the passenger crowding issues of the baggage claim area. The dispensing unit 502 is equipped with a plurality of sensors. It is known to one having one of ordinary skill in the art various sensing type devices can be used including cameras, readers, RFID detectors, and the like. The sensor 516 detects luggage once it has been placed on the dispensing unit. Outlet sensors 518-522 detect the luggage as it approaches each of the plurality of outlet ports. Scanners 524-534 are configured to scan a key associated with a passenger. Upon scanning the key the luggage associated with the key will be retrieved and a display 536-546 will update the state of the luggage indicating a queue of passengers waiting for their luggage. Additional information on the display 536-546 can include the estimated arrival time for the passenger's luggage which will continuously be updated as the luggage is conveyed to the assigned outlet port.

When the luggage reaches the assigned outlet port as it is travels along the conveyor belt 560, a scanner 518-522 will detect the luggage has reached the assigned outlet port. In one or more embodiments, as the luggage passes the scanner associated with the assigned outlet port, an electromechanical arm can be actuated by a signal from the scanner to steer the luggage from the conveyor 560 onto a staging area for the assigned outlet port. The scanners 518-522 will update the status shown on the displays 536-546. Upon arriving at the staging area of the assigned outlet port, the passenger will be notified that their luggage has arrived at the assigned outlet port and passengers can subsequently scan their key at the key reader 524-534 to release their luggage. Releasing mechanisms 548-552 are actuated to release the luggage when the passenger provides their key to the key reader 524-534. In one or more embodiments, the releasing mechanism is an electromechanical device that is configured to push the luggage from a staging area of the assigned outlet port onto a ramp of the assigned outlet port in response to receiving a signal from the key reader. In one or more embodiments, the releasing mechanism can be actuated responsive to a signal received from a mobile device. As the passenger removes their luggage, the system is able to re-assess the luggage load and reassign the outlet port for further luggage distribution. FIG. 5 illustrates a passenger 556 capable of interacting with the system 500 using the key 554, where the key can be provided to the system by a physical ticket or mobile device.

In one or more embodiments, the dispensing unit comprises a plurality of outlet ports. The number of outlet ports is dependent on the size of the dispensing unit and the ability to manage the clustering of passengers. The outlet port of each of the dispensing units can be equipped with a scanner or proximity detector. Further the outlet port can be equipped with a releasing mechanism to release the luggage as it arrives at the outlet port. In one or more embodiments, the luggage is released after the passenger triggers the release of the luggage. For example, passenger can trigger the release of the luggage by scanning the key or by transmitting a signal through a mobile application on their mobile device.

In one or more embodiments, a passenger can request a specific baggage claim dispensing unit and/or outlet port through a website or an application. The request can be made at the time of booking the flight or a request can be transmitted upon arriving at the destination airport and entering the baggage claim area. For example, an elderly individual or an individual requiring special assistance, such as the use of a wheel chair, may request a dispensing unit that is in a less crowded or designated area for individuals requiring further assistance. In another example, a passenger transporting important items preferring to have secure retrieval of their luggage at their destination can make request for a dispensing unit and/or outlet port providing secure retrieval. In another example, heavy luggage can be sent to a specified outlet port which can be equipped with an outlet port that is closer to the floor level to reduce difficulty and removing the luggage from the carousel.

In one or more embodiments, display units are associated with each outlet port for indicating a queue of passengers' luggage to be dispensed. As a passenger scans their key or their presence is detected at the appropriate dispensing unit, an identity of the passenger can be added to the queue on the display. In one or more embodiments, the status of the passenger's luggage can be provided on the display, indicating an estimated time for the luggage to arrive at the outlet port. In one or more embodiments, passengers can receive the status of their luggage through their mobile device.

A passenger can request a new assignment through the mobile application or by scanning their key at an available outlet port scanner of a dispensing unit. An indication can be provided to the mobile device or the display of the outlet port can be updated to provide the notification of the acceptance of the re-assignment. If accepted, the passenger's identifier can be queued on the display associated with the output port and/or a the notification can be provided to the passenger's mobile application indicating an estimated time of arrival and the position the passenger is in the queue for delivery of their luggage.

In an example, a passenger can receive a key that is associated with a destination carousel during check-in at an origin airport. Upon arriving at the destination airport the passenger will approach the assigned dispensing unit and outlet port to scan their key at the carousel outlet key reader. The carousel outlet can indicate to the passenger the luggage has arrived and can subsequently release the luggage when the passenger scans the key at the carousel outlet key reader. After the passenger retrieves their luggage, the system will reassign the carousel outlet port to continue balancing the load of the luggage on the carousel.

In another example, the passenger receives a key associated with their luggage and a carousel outlet port. The passenger can approach a preferred outlet port and scan the key at an outlet key reader. The carousel outlet will display a message to indicate if the outlet change request has been accepted. If accepted, the carousel outlet will indicate when the luggage arrives and releases the luggage after the passenger scans the key. Upon retrieval of the luggage, the system will reassign the carousel outlet port to balance the load on the carousel.

Thus, it may be seen from the foregoing detailed description and illustrations that one or more embodiments of the present disclosure provide technical effects and benefits. For example, the disclosed configuration of dispensing units and outlet ports can achieve a balance of the overall load placed on the disclosed luggage distribution system. By using the disclosed configuration of sensors, readers and detectors, the data gathered by each dispensing unit can be shared among the plurality of other dispensing units to locate a dispensing unit that is available for luggage distribution. Accordingly, the disclosed luggage retrieval and distribution system can efficiently deliver passenger luggage to the correct passenger, as well as relieve baggage claim area crowding by evenly distributing passengers among the multiple baggage claim outlet ports provided according to one or more embodiments. The disclosed embodiments provide passenger benefits in that passengers will no longer have to compete for position at a single outlet to retrieve their luggage. Utilizing the disclosed embodiments, passengers will have the option to request a particular outlet port based on their preferences, the clustering of passengers will be reduced and the traffic flow of passengers through the baggage claim area will be more efficient.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for distributing luggage among a plurality of outlet ports of a luggage distribution unit, the method comprising:
    associating, using a processor system, a passenger key and a luggage identification (ID) device of a luggage unit;
    assigning, using the processor system, the luggage ID device to a dispensing unit based at least in part on a determination of a desired distribution of luggage units among the plurality of outlet ports;
    estimating a time of arrival of the luggage unit at an outlet port of the plurality of outlet ports;
    receiving an outlet change request after an assignment of the luggage unit to an outlet port of the plurality of outlet ports of the dispensing unit; and
    based at least in part on accepting the outlet change request, displaying an estimated time of arrival of the luggage unit to the outlet port.

2. The method of claim 1, further comprising detecting a location of the passenger key;
    providing a status of the luggage ID device of the luggage unit;
    signaling the presence of the luggage ID device and the luggage unit at the dispensing unit;
    receiving the association to access the at least one luggage unit; and
    releasing the at least one luggage unit responsive to receiving the association.

3. The method of claim 1, wherein the association comprises a dispensing unit identifier and an outlet port identifier.

4. The method of claim 1, wherein the association is generated responsive to a request from a passenger, wherein the passenger request comprises a request for a specific dispensing unit and/or outlet port.

5. The method of claim 1, wherein the association is a key, the key being at least one of a QR code, data matrix, and RFID.

6. The method of claim 1, further comprising reassigning the availability of the dispensing unit upon removal of the luggage ID device and the luggage unit.

7. A system for distributing luggage among a plurality of outlet ports of a luggage distribution unit, the system comprising:
    a dispensing unit;
    a plurality of sensors;
    a display unit;
    a processor configured to:
        associate, using a processor system, a passenger key and a luggage identification (ID) device of a luggage unit;
        assign, using the processor system, the luggage ID device to a dispensing unit based at least in part on a determination of a desired distribution of luggage units among the plurality of outlet ports;
        estimate a time of arrival of the luggage unit at an outlet port of the plurality of outlet ports;
        receive an outlet change request after an assignment of the luggage unit to an outlet port of the plurality of outlet ports of the dispensing unit; and
        based at least in part on accepting the outlet change request, display an estimated time of arrival of the luggage unit to the outlet port.

8. The system of claim 7, further comprising configured to detect a location of the passenger key;
    provide a status of the luggage ID device of the luggage unit;
    signal the presence of the luggage ID device and the luggage unit at the dispensing unit;
    receive the association to access the at least one luggage unit; and
    release the at least one luggage unit responsive to receiving the association.

9. The system of claim 7, wherein the association comprises a dispensing port identifier and an outlet port identifier.

10. The system of claim 7, wherein the association is generated responsive to a request from a passenger, wherein the passenger request comprises a request for a specific dispensing unit and/or outlet port.

11. The system of claim 7, wherein the association is a key, the key is at least one of a QR code, data matrix, and RFID.

12. The system of claim 7, being further configured to reassign the availability of the system upon removal of the at least one luggage unit.

13. The system of claim 7, further comprising a mobile device to communicate with the dispensing unit for retrieving the luggage.

14. A computer program product for distributing luggage among a plurality of outlet ports of a luggage distribution unit, the computer program product comprising a computer readable storage medium having program instruction embodied therewith, wherein the computer readable storage medium is not a transitory signal per se, the program instructions executable by a system to cause the system to perform a method comprising:
    associating, using a processor system, a passenger key and a luggage identification (ID) device of a luggage unit;
    assigning, using the processor system, the luggage ID device to a dispensing unit based at least in part on a determination of a desired distribution of luggage units among the plurality of outlet ports; and
    estimating a time of arrival of the luggage unit at an outlet port of the plurality of outlet ports;
    receiving an outlet change request after an assignment of the luggage unit to an outlet port of the plurality of outlet ports of the dispensing unit; and
    based at least in part on accepting the outlet change request, displaying an estimated time of arrival of the luggage unit to the outlet port.

15. The method of claim 14, the method further comprising detecting a location of the passenger key;
    providing a status of the luggage ID device of the luggage unit;
    signaling the presence of the luggage ID device and the luggage unit at the dispensing unit;
    receiving the association to access the at least one luggage unit; and
    releasing the at least one luggage unit responsive to receiving the association.

16. The method of claim 14, wherein the association comprises a dispensing unit identifier and an outlet port identifier.

17. The method of claim 14, wherein the association is generated responsive to a request from a passenger, wherein the passenger request comprises a request for a specific dispensing unit and/or outlet port.

18. The method of claim 14, wherein the association is a key, the key being at least one of a QR code, data matrix, and RFID.

19. The method of claim 14, further comprising reassigning the availability of the dispensing unit upon removal of the at least one luggage unit.

\* \* \* \* \*